United States Patent [19]

Fair

[11] 4,073,145
[45] Feb. 14, 1978

[54] SHORE EROSION CONTROL STRUCTURE
[75] Inventor: Samuel S. Fair, Bay City, Mich.
[73] Assignee: Sandgrabber, Inc., Bay City, Mich.
[21] Appl. No.: 807,560
[22] Filed: June 17, 1977
[51] Int. Cl.² .............................................. E02B 3/06
[52] U.S. Cl. ...................................................... 61/4
[58] Field of Search ........................ 61/3, 4, 5, 37, 39, 61/49

[56] References Cited
U.S. PATENT DOCUMENTS

| Re. 19,786 | 12/1935 | Wood | 61/4 |
| 3,894,397 | 7/1975 | Fair | 61/4 |

FOREIGN PATENT DOCUMENTS

| 469,094 | 7/1914 | France | 61/4 |
| 730,189 | 8/1932 | France | 61/4 |
| 12,566 of | 1849 | United Kingdom | 61/4 |

Primary Examiner—Paul R. Gilliam
Assistant Examiner—David H. Corbin
Attorney, Agent, or Firm—Learman & McCulloch

[57] ABSTRACT

A seawall structure adapted to combat erosion of a shoreline by wave action comprises a perforate wall arranged along and substantially parallel to the shoreline and having openings therethrough facing seaward through which the water of incoming waves may pass. Each opening through the wall forms a tortuous passage for the water so that the energy of the water is dissipated gradually as it flows through the wall, thereby enabling sand entrained in the water to be deposited landward and seaward of the wall, as well as in the openings of the wall. The wall is composed of blocks arranged in horizontal rows and vertical courses, the upper edges of the blocks in the outermost rows projecting above the upper edges of the blocks of the next adjacent rows to provide an interlocking relationship between blocks of the outermost rows and the blocks of the next adjacent rows, as well as to provide for vertical deviations in the openings through the wall.

15 Claims, 7 Drawing Figures

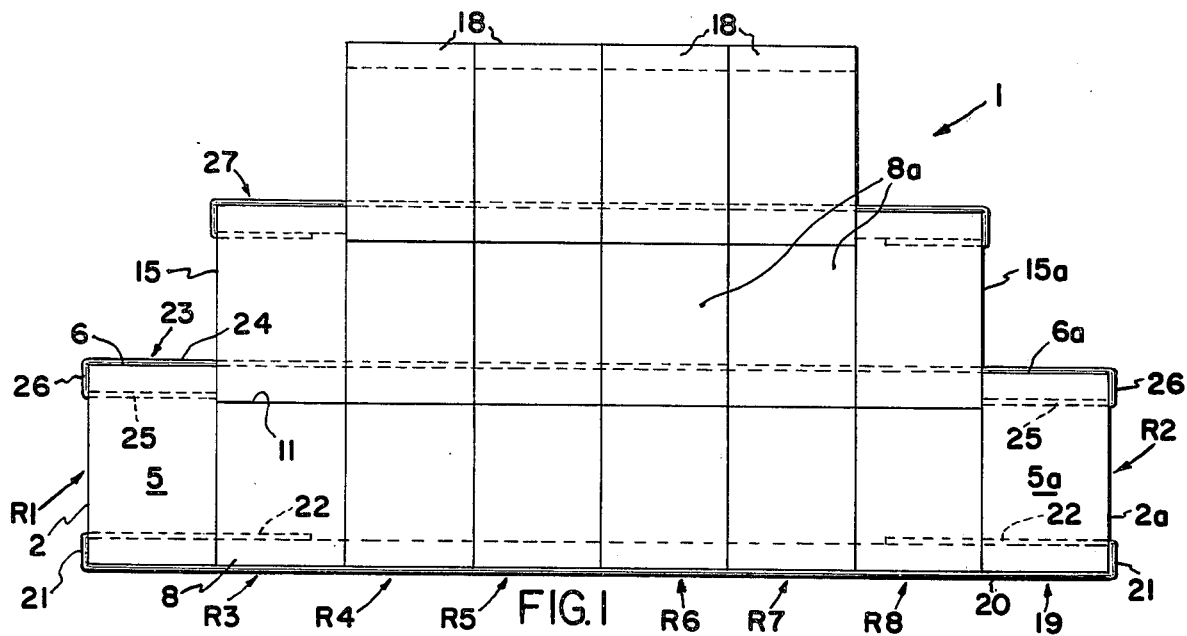
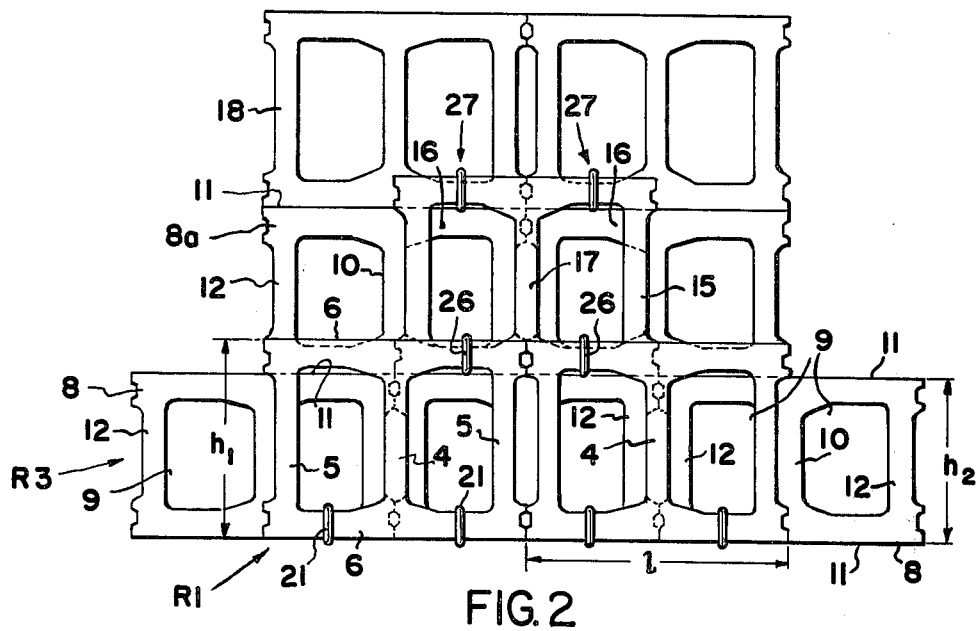
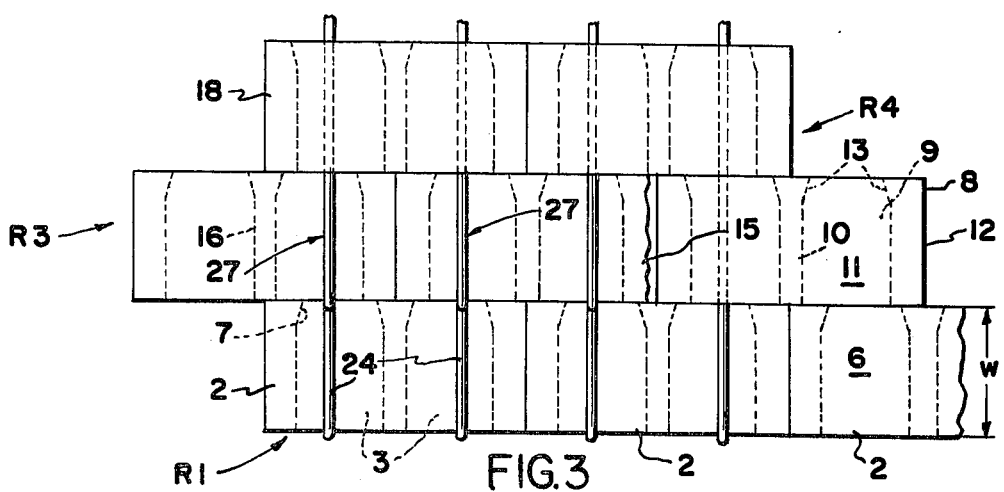

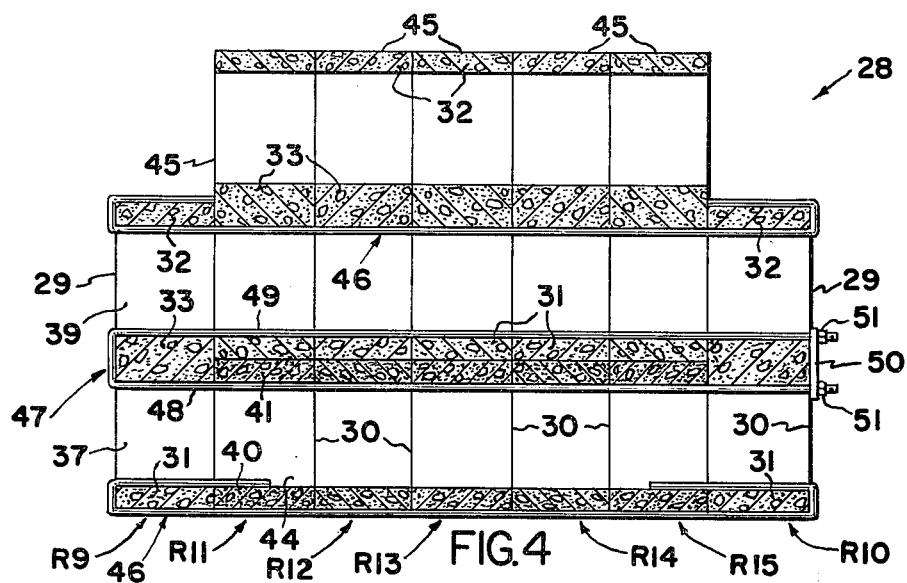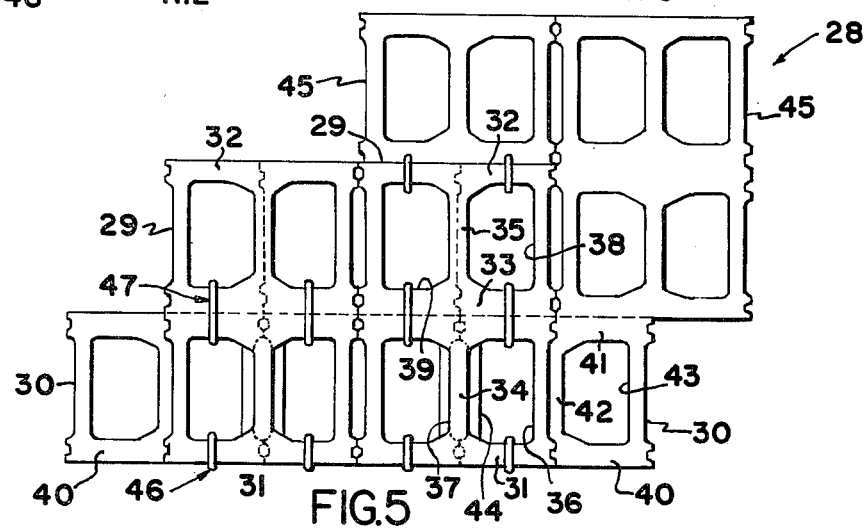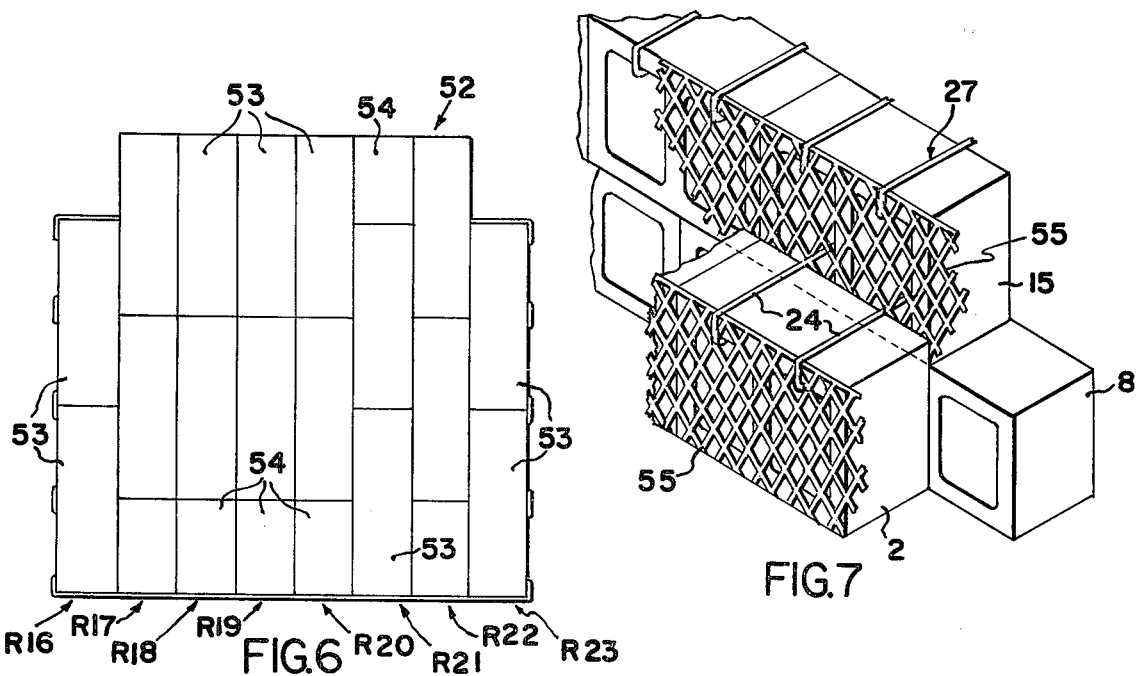

SHORE EROSION CONTROL STRUCTURE

Shore erosion by wave action long has been a problem and many proposals for overcoming or minimizing the problem have been made. One of the most effective solutions to the problem has been the construction of a seawall comprising block-like members arranged in parallel rows and courses along a shoreline, each of the block members having an opening therein and the blocks being staggered longitudinally of the shoreline so as to enable the openings in the blocks of adjacent rows to be out of register but nevertheless in communication with one another to provide a plurality of tortuous paths through the wall through which the water may pass. An incoming wave upon reaching such a wall thus is enabled to pass through the wall, with only a portion of its energy being dissipated. The dissipation of a portion of the wave's energy, however, enables some of the sand entrained in the wave to be deposited in directions seaward and landward of the wall, as well as the openings of the wall. After the passage of time, the deposit of sand builds a beach both landward and seaward on the wall and, in many cases, actually covers the wall itself. A wall of the kind described is disclosed in U.S. Pat. No. 3,894,397, issued July 15, 1975.

Experience in installing structures of the kind disclosed in the aforementioned patent has revealed that the wall is at its most vulnerable immediately after its installation because of insufficient time and wave action to deposit appreciable quantities of sand in, seaward and landward of the wall. Thus, extensive wave action caused by a storm or the like immediately following installation of a wall subjects the blocks to enormous forces tending to displace some of the blocks. It has been found that block displacement usually occurs at the second and higher courses and is caused by a combined lifting and tilting of the blocks under the force of an incoming wave.

It also has been found that, in some areas, violent wave action enables the waves to entrain not only sand, but fairly large rocks and other debris which, if thrown against the blocks with sufficient force, can result in breakage of the blocks.

The foregoing disadvantages of known seawalls formed of block-like members are overcome by a wall constructed according to the present invention by the provision of a wall composed of blocks arranged similarly to the arrangement disclosed in U.S. Pat. No. 3,894,397, but differing from the latter in that the blocks of the outermost rows of the wall are of such height that their upper edges extend above the upper edges of the blocks forming the lower course of the adjacent rows. The upper edges of the blocks of the outermost rows thus overlap to some extent the lower edges of the second course of blocks of the next adjacent rows, thereby making it much more difficult for the latter blocks to tilt. In effect, therefore, there is an interlocking relationship between the blocks of the outermost rows and the blocks of the next adjacent rows which rigidifies the wall and enables it to withstand considerably more force than it otherwise would be capable of withstanding.

In those areas in which incoming waves entrain rocks and other potentially wall-damaging debris, the seaward side of the wall may be covered with a protective mesh material which protects the seaward surfaces of the wall, but does not significantly interfere with the flow of water through the wall.

A wall constructed in accordance with the principles of the invention is disclosed in the accompanying drawing, wherein:

FIG. 1 is an end elevational view of a wall constructed in accordance with one embodiment of the invention;

FIG. 2 is a fragmentary elevational view of the wall shown in FIG. 1 as viewed from a seaward position;

FIG. 3 is a top plan view of that portion of the wall shown in FIG. 3;

FIG. 4 is a view similar to FIG. 1, but illustrating a modification;

FIG. 5 is a fragmentary elevational view of the wall shown in FIG. 4;

FIG. 6 is a view similar to FIG. 1, but illustrating a further modification; and FIG. 7 is a fragmentary isometric view of a portion of the wall shown in FIG. 1.

A wall constructed in accordance with the embodiment of FIGS. 1–3 is designated generally by the reference character 1 and comprises a first row R1 of concrete blocks 2 of conventional construction, each block having a pair of openings 3 extending completely therethrough and separated by a central partition 4. Each block has end walls 5 and side walls 6, and each block is laid on one of its side walls along and substantially parallel to a shore line so that its openings 3 are substantially horizontal and face seaward. Many conventional blocks like the blocks 2 have openings 3 which taper as at 7 adjacent one end thereof. If the blocks 2 have such tapered openings, the tapered ends of the openings should face landward.

The blocks of the most seaward row R1 are laid end to end and preferably in abutting relation. Rather than each block being arranged exactly in prolongation of an adjacent block, it is preferred that the blocks of a row be laid in such manner that the wall, when completed, is arcuate and somewhat convex seawardly. The blocks of the row R1 may be laid either in the water or along the water line, although the row of blocks could be laid upon the beach at or above the low water line in tidewater areas.

When the blocks 2 are laid on their sides, each block has a preferably uniform nominal height $h_1$ which, for purposes of illustration, may comprise 12 inches. The nominal width w of such block may be 8 inches and its nominal length 1 may be 16 inches.

The wall 1 includes a most landward row R2 of blocks that preferably are identical in all respects to the blocks of the most seaward row R1 and are identified by the same reference characters, followed by the suffix a.

In the disclosed embodiment, each of the rows R1 and R2 consists of a single course of blocks. It would be possible, however, for such rows to include multiple courses of blocks.

Adjacent the most seaward row R1 of blocks is a row R3 of blocks 8 arranged in end to end abutment and parallel to the row R1. Each block 8 has a pair of openings 9 spaced by a partition 10, the openings 9 facing searward so that each block has top and bottom walls 11 and end walls 12. If the openings 9 have tapering ends 13, the blocks are so arranged that the tapered ends face landward.

The blocks of the row R2 are staggered longitudinally of the blocks of the rows R1. The relative positions of the blocks of the rows R1 and R3 are such that the openings 3 in the blocks of the row R1 communicate with the openings 9 in the blocks 8 of the row R3, but are out of register, both horizontally and vertically.

The length and width dimensions of the blocks 8 correspond to the length and width dimensions, respectively, of the blocks 2, but the heigth $h_2$ is less than the height $h_1$ of the blocks 2. The nominal height of each block forming the bottom course of the row R3 is uniform and is 10 inches, for example, or 2 inches less than the height of the blocks of the row R1. As a consequence the top wall 11 of each block in the row R3 is at a lower level than that of the top wall 6 of the blocks of the row R1.

Between the rows R2 and R3 is a plurality of additional parallel rows of blocks, the blocks forming the lower course of each row R4–R8 corresponding exactly to the blocks 8 forming the lower course of the row R3. The blocks of the rows R4–R8 also are staggered longitudinally of the next adjacent rows in such manner that the openings through the blocks of adjacent rows communicate, but are out of register. Thus, the openings in the blocks in the first course of each of the rows R1–R8 provide a plurality of water passageways throughout the entire width of the wall, but the passageways are tortuous.

In the embodiment of FIGS. 1—3, the row R3 has a second course of blocks 15 which correspond in all respects to the block 2. That is, the nominal height of each block 15 corresponds to the height of the blocks 2 and each block 15 has seaward facing openings 16 separated by a partition 17. The blocks 15 are staggered longitudinally of the blocks forming the row R1 and also are staggered longitudinally of the blocks forming the first course of the row R3. The blocks 15 rest upon the upper wall 11 of the blocks 8 and, since the height of the blocks 8 is lower than that of the blocks 2, the upper edge of the latter overlaps the lower edge of the blocks 15.

The second course of the row R8 is composed of blocks 15a corresponding exactly to the blocks 15, with the upper edges of the blocks 5a overlapping the lower edges of the blocks 15a. Between the rows formed by the blocks 15 and 15a are rows of blocks 8a forming second courses of the rows R4–R7, and these blocks correspond exactly to the blocks 8. That is, the blocks 8a are of lower height than the blocks 15, 15a so that the upper edges of the latter extend above the blocks 8a.

Each of the rows R4–R7 has a third course of blocks 18 which correspond exactly to the blocks 2 and 15. Due to the difference in height between the blocks 15, 15a and the blocks 8a, the lower edges of the blocks 18 in the rows R4 and R7 are overlapped by the upper edges of the blocks 15, 15a, respectively.

The wall 1 has a truncated pyramid shape, when viewed in end elevation, and each block of the second and third courses of the rows R3, R4, and R7, R8 is interlocked with the blocks of the next adjacent outermost row. The tendency of the blocks of the second and third courses to rock or tilt therefore is minimized greatly.

It is preferred that the blocks of each row and course be bound together. Although many different kinds of binding or retaining devices may be used, including bonding of the blocks to one another, it has been found convenient to use elongate, galvanized steel rods to join the blocks together. Preferably, the lower course of blocks in each row overlies a plurality of rods 19 each of which has an elongate portion 20 having its ends reversely turned as at 21 to form end portions 22 that substantially parallel the portion 20 and extend a substantial distance inwardly of the wall. The rods 19 preferably are bent to the configuration illustrated in FIG. 1 prior to erection of the wall 1, and the end portions 22 are of such length as to exceed the width of any one of the blocks. To commence erection of the wall, therefore, the blocks 5 and 5a are lowered onto the rods 19 inwardly of the free ends of the portions 22 and then are slid in directions away from one another to the positions shown in FIG. 1. The length of each extension 22 preferably is such that the extension, if rocked upwardly, will engage an upper portion of the associated block in the row R3 or R8 so as to minimize the likelihood of the rod's being separated from the associated blocks.

As is best indicated in FIG. 2, there is a rod 19 for each opening in each block of the rows R1 and R2.

Retaining rods 23 are utilized to join the blocks of the second course to the blocks of the first course, there being one rod 23 for each opening in the blocks 15, 15a. Each rod 23 includes an elongate portion 24 which extends completely through all the blocks of the second course and has end portions 25 reversely turned as at 26 to embrace the upper walls of the blocks 5, 5a. Rods 27 similar to the rods 23 are provided for joining the blocks of the second course to the blocks of the third course.

When a wall 1 has been completed, a large portion of the sand laden water of incoming waves reaching the wall will be able to flow through the wall, but the tortuous passages through the wall provided by the staggered openings and the differences in block height will exert a restrictive or throttling effect on the passage of the water through the wall so as to dissipate a portion of the force of the incoming wave. The throttling action promotes the settling or depositing of entrained sand on the landward side of the wall, and the wall in turn induces a second throttling action on the ebbing wave to promote further settlement of entrained sand from the water as the wave passes outwardly through the wall. In time, sand will be deposited landward of the wall, seaward of the wall, and in the passages of the wall. Eventually, the deposited sand will add appreciably to the width of a beach, both landward and seaward of the wall and, depending upon the height of the wall and the waves, the deposited sand will cover the wall.

The height and width of the wall 1 is determined generally by the height of the waves encountered or expected to be encountered during storms. Thus, the wall height may have more or fewer than three courses of blocks and it may have more or fewer than eight rows of blocks.

The wall 28 shown in FIGS. 4 and 5 is similar to the wall 1, but differs from the latter primarily in the utilization of double height blocks 29 at the most seaward and most landward rows R9 and R10, respectively, with single height blocks 30 for the lowest course of each of the intervening rows R11–R15. The terms single height and double height mean that the blocks 29 are twice the height of the blocks 30. Thus, if the blocks 30 have a nominal height of 12 inches, the blocks 29 have a nominal height of 24 inches.

Each block 29 has a lower wall 31, an upper wall 32, and a centrally located, horizontal partition 33. Each block 29 also has a pair of vertical partitions 34 and 35 which, together with the partition 33, provide four openings 36, 37, 38, and 39 through each block.

Each of the single height blocks 30 has a lower wall 40, an upper wall 41, and a vertical partition 42 which separates two horizontally spaced openings 43 and 44.

Again, the individual blocks of the several rows are staggered longitudinally of the wall so that the openings of the adjacent blocks will communicate with one another, but will be out of register with each other, thereby again providing a plurality of tortuous passages through the wall.

Each of the rows R11-R15 has a second course of blocks 45 which preferably are double height blocks and correspond to the blocks 29.

The construction of the wall 28 is such that the blocks of the outermost rows project above the first course of the blocks of the adjacent rows so as to provide an interlock between the blocks of the outermost and adjacent rows to minimize any tendency of the blocks 45 to tilt.

The blocks of the several rows may be joined together by rods 46 corresponding substantially to the rods earlier described. Because of the two to one ratio between the heights of the blocks 29, 30, and 45, it is possible to utilize also elongate, U-shaped rods 47 having parallel runs 48 and 49 threaded at their ends for the accommodation of an anchor plate 50 retained by nuts 51.

The embodiment of FIG. 6 comprises a wall 52 composed of a number of parallel rows R16-R23 of blocks, the rows R16 and R23 being the most seaward and the most landward, respectively. The blocks utilized in the wall 52 again may be double height blocks 53 and single height blocks 54, corresponding to those earlier described and laid in such manner that the openings in the blocks of adjacent rows communicate but are out of register. The blocks 53 forming the lower course of the seaward and landward rows project above the blocks 54 forming the lower course of the next adjacent rows R17 and R22, thereby providing the interlocking construction referred to in connection with the wall 28. In the construction of the wall 52, however, an additional one or more rows of blocks near the landward side of the wall are constructed in such manner as to provide a furthere interlock.

In the disclosed embodiment the further interlock is provided by reversing the order of courses of the row R21. That is, the lowermost course of the row R21 is composed of double height blocks 53 and the uppermost course is composed of single height blocks 54. Again, the blocks forming the wall 52 may be joined by rods of the kinds earlier described.

If a wall constructed according to any of the embodiments of the invention is utilized in an area where rocks, shingle, and other potentially damaging debris may be entrained in incoming waves, the wall may be protected from damage by covering those blocks confronting the incoming waves with a lattice-like, galvanized metal sheathing 55, such as chain link fencing. See FIG. 7. The sheathing may be retained by the same rods which join the blocks to one another. The sheathing prevents direct engagement between the blocks and larger stones and the like, but does not offer any significant deterrent to the flow of water through the openings in the blocks.

The disclosed embodiments are representative of presently preferred forms of the invention, but are intended to be illustrative rather than definitive thereof. The invention is defined in the claims.

I claim:

1. A shore erosion control structure comprising a wall extending longitudinally along a shoreline, said wall comprising a plurality of substantially parallel rows of block members arranged end to end, at least some of said rows having a plurality of courses of said block members, each of said block members having at least one opening extending completely therethrough and facing seaward, the openings in the block members of adjacent rows being in communication with each other to enable the passage of water through said wall, but being out of register with each other to provide tortuous passageways through which water may flow, and the block members of the lowermost course of the most seaward row having a height greater than the height of the corresponding block members of the next adjacent row, whereby the block members of the lowermost course of the most seaward row project above the corresponding block members of the next adjacent row and overlap the lower portion of the block members forming the next higher course of said next adjacent row.

2. A structure according to claim 1 wherein the block members of the lowermost course of the most landward row have a height greater than the height of the corresponding block members of the next adjacent row.

3. A structure according to claim 2 wherein the height of the block members of the lowermost course of the most seaward and the most landward rows is substantially uniform.

4. A structure according to claim 2 wherein the height of the block members of the lowermost course of all rows between the most landward and the most seaward is substantially uniform.

5. A structure according to claim 1 wherein the height of the block members forming said next higher course of said next adjacent row corresponds substantially to the height of the block members of the lowermost course of the most seaward row.

6. A structure according to claim 1 wherein said most seaward row has fewer courses than the next adjacent row.

7. A structure according to claim 6 wherein said next adjacent row has fewer courses than the next adjacent landward row.

8. A structure corresponding to claim 1 wherein the height of the block members of the lowermost course of the most seaward row is substantially twice the height of the blocks of the next adjacent row.

9. A structure according to claim 1 wherein the most seaward row of said block members has fewer courses than more landward rows of said block members.

10. A structure according to claim 9 wherein the height of the block members forming said most seaward row is greater than the height of the block members forming the lowest course of the next adjacent rows.

11. A structure according to claim 1 including a lattice-like sheathing overlying the openings of the block members of the most seaward row.

12. A structure according to claim 11 including means for securing said sheathing to said wall.

13. A shore erosion control structure extending along a shoreline comprising a plurality of block members forming an elongate seaward row, a plurality of block members forming an elongate landward row substantially parallel to but spaced from said seaward row, and a plurality of block members forming a plurality of intervening rows between said seaward and landward rows, each of said intervening rows having a plurality of substantially vertical courses of block members, the height of block members in selected ones of said rows being different from the height of block members in others of said rows to provide a vertical overlap between the block members of said selected ones of said rows and the block members of the rows adjacent said selected ones of said rows, each of said block members having at least one opening extending completely therethrough and facing seaward, the openings in the block members of adjacent rows being in communication but being out of register to provide tortuous passages in said wall through which water may flow.

14. A structure according to claim 13 wherein the height of the block members forming the lowermost course of rows next adjacent said seaward row is less than the height of the contiguous block members of said seaward row.

15. A structure according to claim 13 wherein the height of the block members forming the lowermost course of at least one intervening row is greater than the height of the block members forming the lowermost course of the adjacent intervening row.

* * * * *